G. R. CLARK.
ELECTRIC TIME SWITCH.
APPLICATION FILED JULY 3, 1907.

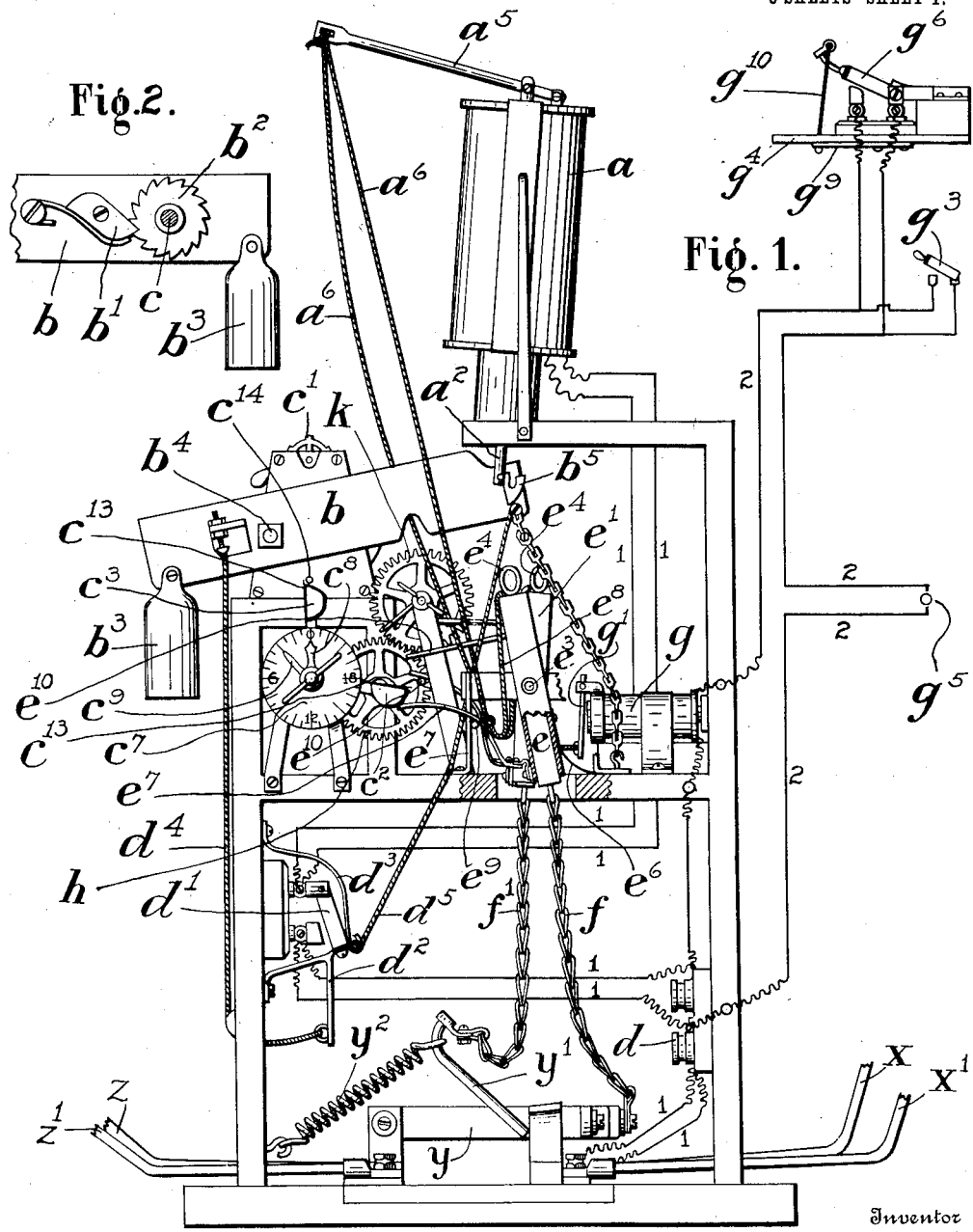

944,319.

Patented Dec. 28, 1909.

5 SHEETS—SHEET 2.

Witnesses
C.W.H. Christman.
Chas. I. Welch

Inventor
George R. Clark

By Staley W. Bowman
Attorneys

G. R. CLARK.
ELECTRIC TIME SWITCH.
APPLICATION FILED JULY 3, 1907.
944,319.
Patented Dec. 28, 1909.
5 SHEETS—SHEET 3.
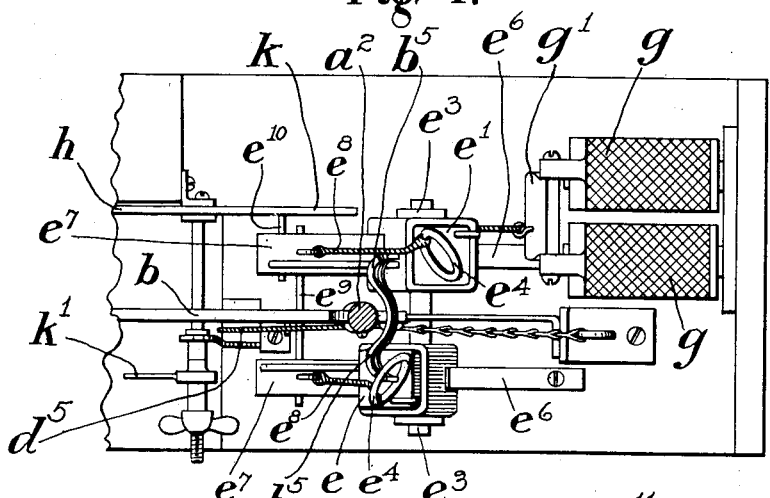
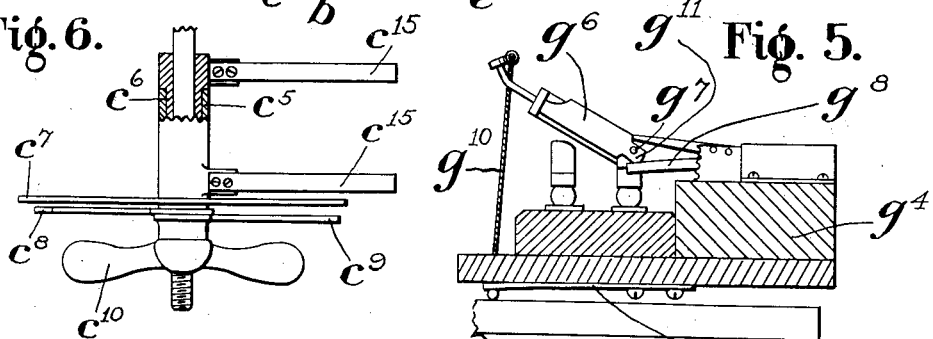
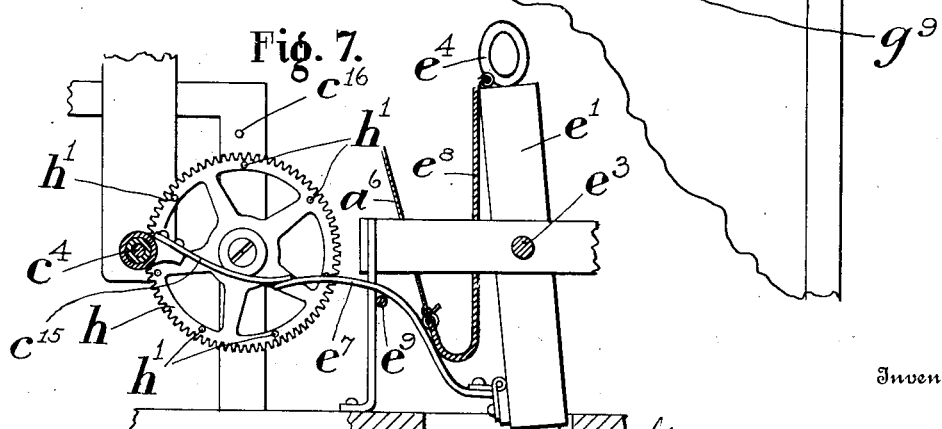
Inventor
George R. Clark
Witnesses
W. H. Christman
Chas. J. Welch
By Staley and Bowman
Attorneys

G. R. CLARK.
ELECTRIC TIME SWITCH.
APPLICATION FILED JULY 3, 1907.

944,319.

Patented Dec. 28, 1909.
5 SHEETS—SHEET 4.

Witnesses
W. H. Christman
Chas. J. Welch

Inventor
George R. Clark
By Haley & Bowman
Attorneys

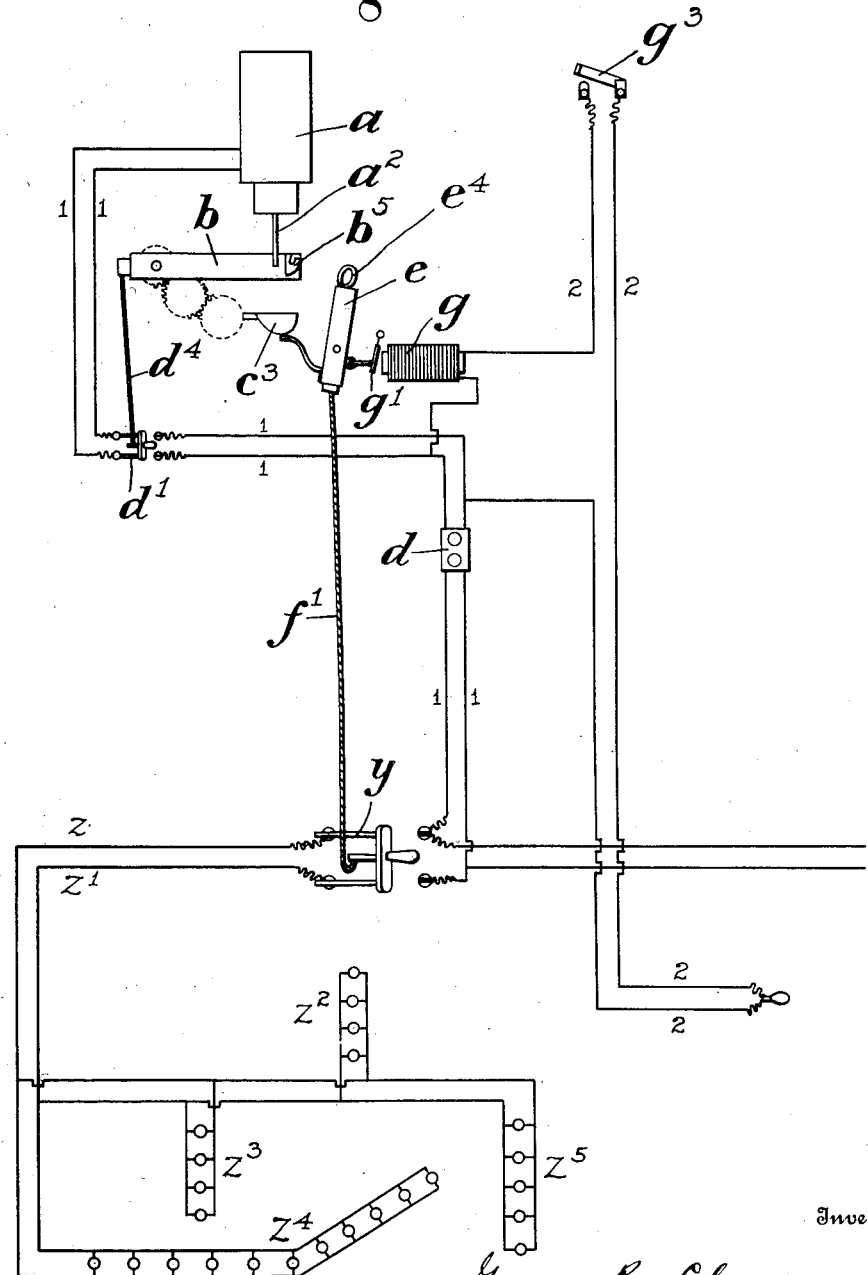

UNITED STATES PATENT OFFICE.

GEORGE R. CLARK, OF DAYTON, OHIO, ASSIGNOR TO CLARK & HARVEY, OF DAYTON, OHIO, A FIRM.

ELECTRIC TIME-SWITCH.

944,319.  Specification of Letters Patent.  Patented Dec. 28, 1909.

Application filed July 3, 1907. Serial No. 381,965.

*To all whom it may concern:*

Be it known that I, GEORGE R. CLARK, a citizen of the United States, residing at Dayton, in the county of Montgomery and State of Ohio, have invented certain new and useful Improvements in Electric Time-Switches, of which the following is a specification.

My invention relates to electric switches and timing operating mechanism therefor.

The object of the invention is to provide mechanism for operating time switches which shall be simply constructed, electrically operated, and which shall effectually control the operation of switches to the on and off positions at certain specified times.

A further object of the invention is to provide means for automatically varying the periods at which the time switches may be operated.

A further object of the invention is to provide means by which the operation of the switches may be varied by other than automatic mechanism so as to be manually as well as automatically controlled.

I accomplish the foregoing objects and other incidental objects by the mechanism shown in the accompanying drawings in which—

Figure 3:
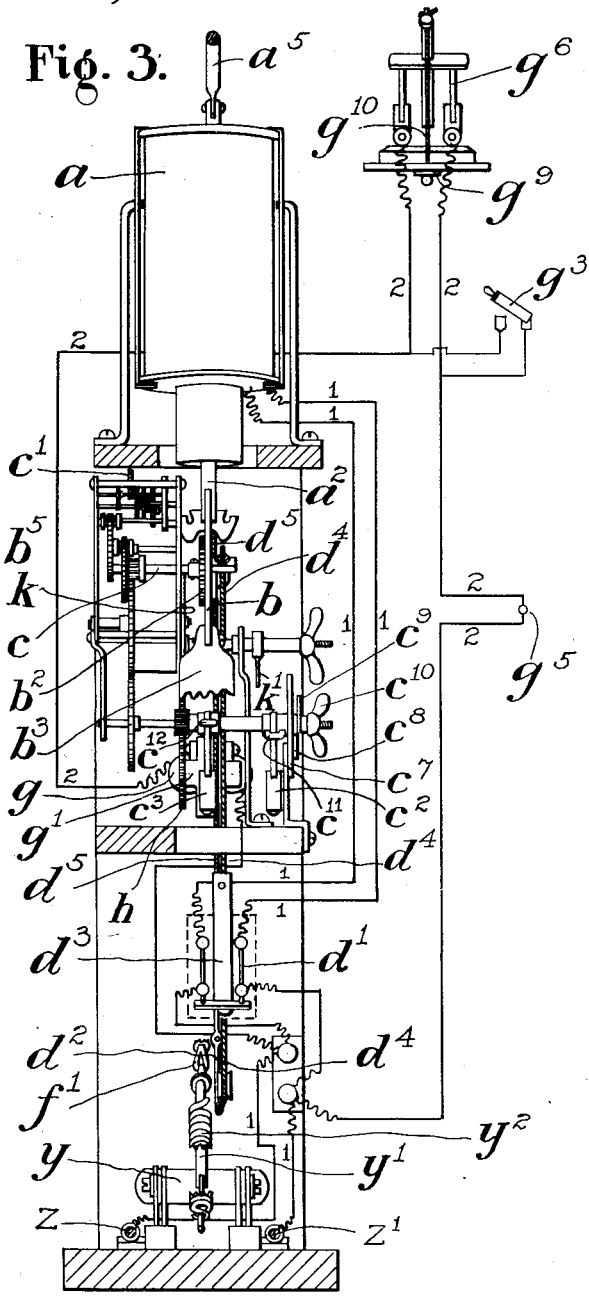
Figure 12:
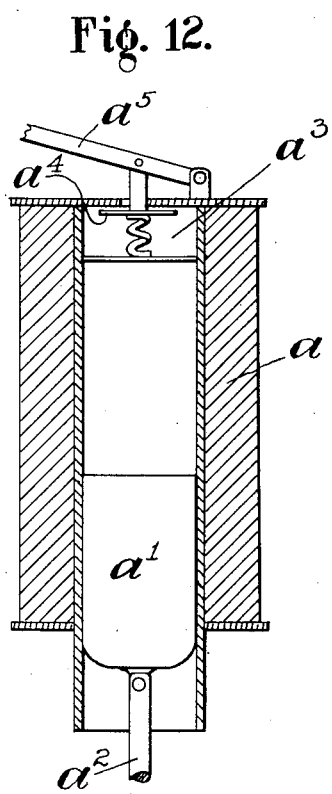
Figure 13:
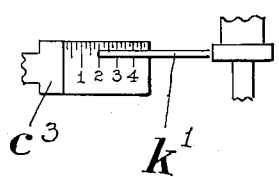
Figures 8, 9, 10:
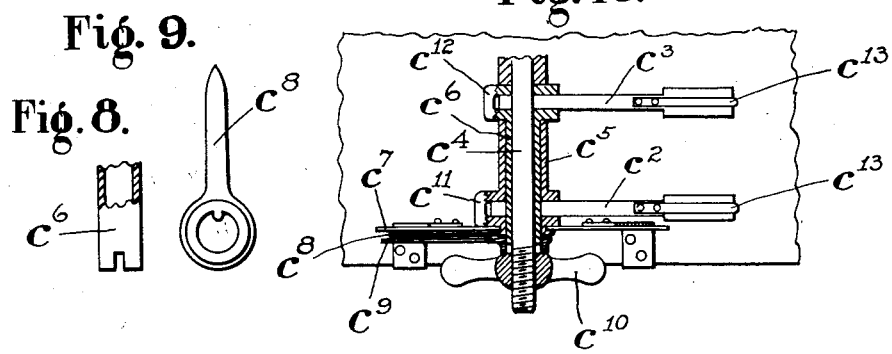
Figure 11:
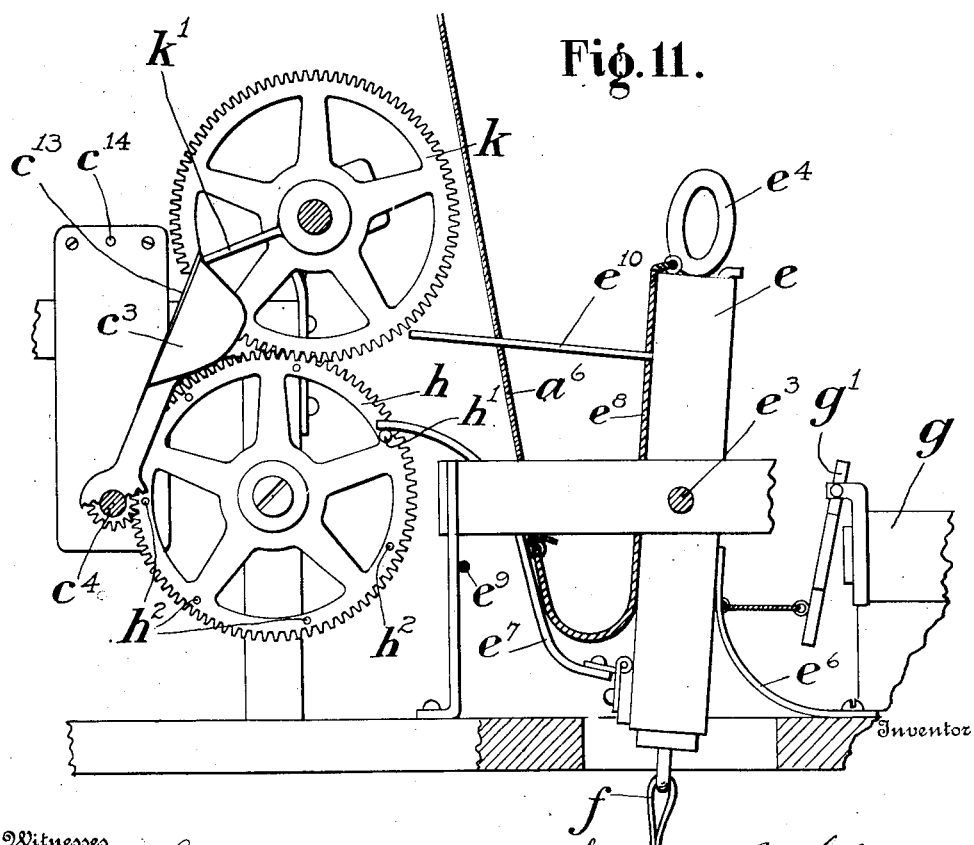

Figure 1 is a front elevation of the device embodying my invention. Fig. 2 is a detail of a portion of the same. Fig. 3 is a side elevation partly in section, the frame being cut away to disclose the operating parts some of which are shown, in a measure, diagrammatically. Fig. 4 is a plan view of a portion of the same. Fig. 5 is a sectional view of one of the switches or circuit closer. Fig. 6 is a view of a modification. Fig. 7 is a detail view of the timing mechanism showing the modification. Figs. 8 and 9 are detail views of the hand and sleeve forming part of the timing mechanism. Fig. 10 is a section elevation showing the arrangement of part of the timing and tripping mechanism. Fig. 11 is a side elevation of a part of the timing and tripping mechanism on a larger scale. Fig. 12 is a sectional view of the solenoid showing the air chamber and valve. Fig. 13 is a detail view of a modification of the tripping mechanism. Fig. 14 is a diagrammatic view of the mechanism.

Like parts are indicated by similar characters of reference throughout the several views.

In my improved timing switch, the prime mover both for the timing mechanism and switch-operated mechanism is an electric-operated device preferably in the nature of a magnet or solenoid, $a$, the core, $a^1$, of which is attached through the medium of a rod, $a^2$, to a pivoted main operating lever, $b$. The weight of the core, $a^1$, when not under the magnetic influence of the solenoid, $a$, is pressing downwardly upon the inner extremity of the lever $b$. This lever $b$ carries on its inner side (see Fig. 2) a spring-pressed pawl, $b^1$, which engages with a ratchet wheel, $b^2$, on a shaft, $c$, which would correspond to the spring or weight shaft of a clock mechanism, which clock mechanism may be of any simple, ordinary type, preferably with an escapement, $c^1$, to insure its uniform movement. I have shown attached to the opposite end of the lever, $b$, a counterbalancing weight, $b^3$. The use of this weight depends more or less upon the relative length of the lever from its pivotal point, $b^4$, to the point of attachment of the rod, $a^2$, it being understood that the weight of the core, $a^1$, of the solenoid pressing on the lever, $b$, and operating through the pawl, $b^1$, and ratchet wheel, $b^2$, upon the motor shaft, $e$, is the motive power for driving said motor or timing device. It will be understood that the weight applied to the lever, $b$, being the relative difference between the counterweight, $b^3$, and the core, $a^1$, causes the right-hand or inner end of the lever, $b$, (Fig. 1) to move downwardly, and thus cause the motor mechanism to operate in the nature of a clock. Inasmuch, however, as this lever has only a limited movement, means must be provided for periodically restoring the lever to its upper position thus periodically winding up the motor. In the machine I have illustrated I have shown mechanism for accomplishing this say every fifteen or twenty minutes, or from three to four times an hour, which mechanism I shall now proceed to describe.

At the bottom of Fig. 1 is shown the feed wires $x$ and $x^1$ of the main electric circuit. These feed wires lead to the poles of a switch which may be of the usual type and which when closed establishes an electric connection with the main wires, $z$ and $z^1$, of the circuit which is to be opened and closed at suitable intervals determined by the timing mechanism hereinafter to be described. From the main feed wires, $x$ and $x^1$, I establish an electric circuit marked 1, 1, 1, etc., and which includes a fuse-box, $d$, a spring actuated switch, $d^1$, and the solenoid, $a$, of the main operating solenoid. The switch, $d^1$, is normally held in its open position by means of a latch, $d^2$, which preferably engages the bar of the switch and holds the switch in its normal open position against the tension of the spring, $d^3$. From this latch, $d^2$, there extends a suitable flexible connection, $d^4$, which is attached to the main operating lever, $b$, the construction being such that when the operating lever, $b$, has, under the influence of the weight of the core, $a^1$, moved to near the limit of its motor operating stroke, the trip or latch, $d^2$, will be withdrawn from the switch, $d^1$, which will permit said switch to close thus establishing an electric connection through the circuit 1, 1, 1, etc., and the magnet, $a$, of the solenoid. This will instantly cause the solenoid to be drawn upwardly by the magnet, $a$, bringing the operating lever, $b$, to its original or motor-operating position, as shown in Fig. 1. Means are provided for immediately disconnecting the switch, $d^1$, when the lever, $b$, reaches its original position, and this is preferably accomplished by establishing a connection, $d^5$, between the lever, $b$, and the switch on the opposite side of the pivotal connection, $b^4$, from that to which the connection, $d^4$, is established. A result of this connection is that as soon as the lever, $b$, is drawn back to its starting point by the action of the solenoid, the switch is withdrawn, and the magnetic influence of the solenoid is destroyed, and the weight of its core then again operates upon the lever, $b$, to cause the timing motor or clock mechanism to continue its operation. The arrangement is such that the winding of this motor by drawing the lever back to its original position is practically instantaneous. The solenoid operating instantly when the connection is made and in the slightest possible interval of time, the electric circuit is again broken so that the winding of the motor or timing mechanism is accomplished, as before stated, almost instantaneously. Means are also provided by which this solenoid at certain intervals determined by the clock or timing mechanism is adapted to move the main switch, $y$, either to an open or closed position, the time during which the switch remains open or closed being determined by the timing mechanism. To this end I provide adjacent to the lever, $b$, in its range of movement in its oscillation about the pivotal center, $b^4$, two plungers, $e$ and $e^1$. These plungers are each mounted in casings which are pivoted at $e^3$ so that they may be moved to or from the line of travel of the oscillating lever, $b$. Each of the plungers is provided at the top with a ring or engaging portion, $e^4$, and the lever is provided on opposite sides with projecting hooks, $b^5$. When the plungers, or plunger casings, are in a normal position, these hooks may vibrate up and down without contacting with the rings, $e^4$, or either of them, but if either of the plunger casings should be moved to the inclined position shown at $e$ in Fig. 1, then the hook, $b^5$, corresponding to this plunger will engage in said ring, and at the next upward movement of the lever this plunger will be drawn quickly upward. These plungers, $e$ and $e^1$, are connected preferably by chains or similar connections, $f$ and $f^1$, to the switch, $y$, the connection, $f$, being made to the front end of the switch and the connection, $f^1$, to an extended arm, $y^1$, of said switch to which there is also preferably connected a spring, $y^2$, the direction of the force of the spring being such that when the switch is closed the force of the spring is so nearly against the pivotal connection of the switch that it has little or no effect upon it, but as soon as the switch is moved to a slightly open position then the force of the spring will tend to further open the switch and bring the blades thereof to a substantially vertical position, the closed position being a substantially horizontal one. Now, it will be seen that if the plunger, $e$, is drawn up quickly the switch through the connection, $f$, will be raised from the closed to the open position and assisted by the spring, $y^2$, will be brought to a substantially horizontal position.

The plunger casings are held in their normal vertical and inoperative position by springs, $e^6$, and when released they will immediately resume their normal and inoperative position. For moving these plungers into operating position, I employ engaging projections operating in connection with the timing motor which at certain intervals will engage and move these plungers, as before stated, into their operative position, and this is preferably accomplished as follows: There is attached to each one of the plunger casings an extending arm, $e^7$. These arms extend in the path of traveling arms or tripping devices, $c^2$, and $c^3$, journaled on a shaft, $c^4$, which is adapted to receive motion from the timing motor. These traveling arms or tripping devices are not connected permanently to this shaft, $c^4$, but are each mounted upon sleeves, $c^5$ and $c^6$, preferably telescopic which extend along said shaft and project through a dial, $c^7$. Adjacent to said dial each of the sleeves is provided with an indicating hand, $c^8$ and $c^9$. The shaft, $c^4$, is preferably screw-threaded at its outer end and provided with a thumb nut, $c^{10}$, and the sleeves, $c^5$ and $c^6$, are made of such relative lengths that when the thumb nut is screwed up against the longer of the sleeves, both of said sleeves will be clamped against shoulder projections on the shaft (as indicated in Fig. 10) so that the hands and sleeves will become attached to the shaft, $c^4$, and move therewith. I have shown in the drawings the trip mechanism, $c^2$, preferably constructed in the nature of weights, and when so constructed these arms, $c^2$, are preferably not connected directly to the sleeves, $c^5$ and $c^6$, but are loosely attached to the same, engaging bars or projections, $c^{11}$ and $c^{12}$, being each adapted as these sleeves are revolved with the shaft, $c^4$, to contact with its respective arm and carry the arm around with it; the weights being thus connected to the shaft, $c^4$, and moving therewith will be carried by the projections, $c^{11}$ and $c^{12}$, to a position vertically above the shaft. When carried beyond this position, the weight will drop and contact with the arm of one of the plunger casings. This will move the said plunger into operative position so that when the vibrating lever, $b$, reaches the proper position its hook will engage with the plunger and upon the next winding movement of the solenoid the plunger will be drawn up with the lever and the switch operated. It will be seen that if the winding of the motor takes place at an interval of every fifteen or twenty minutes the main switch must be operated at a period not later than this interval after the plunger has been moved into place. By the arrangement of the sleeve connections shown in Fig. 11, these weighted trip arms may be placed at any distance apart and this will be indicated by the respective hands on the dial, $c^7$, so that the second trip or weight will be brought upward and caused to move the second plunger into position at any given interval after the first one is moved, hence if the first movement is adapted to operate the switch to a closed position the second movement will be adapted to operate the switch to an open position and thus the switch will be automatically closed at the given time indicated by the position of the first tripping device and will be automatically opened at any interval thereafter within the register of movement of the hands, so that the main circuit may be closed and allowed to remain closed for a given time and then automatically opened.

The shaft, $c^4$, which carries the tripping devices is preferably geared to the clockwork or timing mechanism so that it makes one revolution each twenty-four hours, and the dial will be correspondingly graduated, the graduations being as finely sub-divided as may be desirable for setting the tripping devices. It is obvious that if the sleeves be allowed to remain loosely on the shaft, $c^4$, the tripping devices will not be moved and hence the switches will not be operated. If it is desired, however, that the switch should be opened at a certain time, the hand corresponding to the tripping device which moves the switch closing plunger to its operative position will be moved to a position on the dial which shall be as many units back of the operating position as there are hours or minutes between the time of setting and the time the switch is to be closed. Now, if it is desired that the circuit should remain closed for a definite time, say two or three hours, the second hand would be set back of the first hand a corresponding amount, and the sleeves being then connected to the shaft by the compression nut the first tripping lever would be brought to its tripping position at the time indicated which would cause the switch to be closed, as before described, after which the second device would, at the time mentioned, be brought to its operating position and the switch would be again opened. If no change were made in these hands this operation would continue in each twenty-four hours, the switch being opened at the given time and closed at the given time.

It should be noted that the projecting arms, $e^7$, of the plunger casings are hinged to said casings, the hinged connection being such that the arms may move upwardly toward the plunger casing in relation to said casing but has a stop to limit its downward movement. There is also a flexible connection, $e^8$, extending from said arm, $e^7$, to the plunger so that as the plunger is drawn upwardly the arm, $e^7$, will be drawn upwardly and thus be positively released from the tripping arm so that after the plunger is operated it will be returned to its normal position by the spring and the possibility of its being operated a second time without being tripped is overcome. A stationary stop, $e^6$, is preferably provided for the arm, $e^7$, against which said arm contacts when the plunger has been moved to its operative position, the tripping arms being adapted to hold the plungers in this position against the tension of the returning spring, $e^6$, until the plunger is operated.

When the switch is used for turning on the lights in display windows or electric signs, or for such purposes, it is sometimes desirable that the lights shall not be turned on at certain times, for instance on Sunday nights or any other stated period. To accomplish this without manual labor, I preferably provide an additional wheel, $h$, which is geared to the shaft, $c^4$, in such relative position that it will make one revolution at say every seven revolutions of said shaft. In this wheel, which I have termed the "seven-day wheel," $h$, I place a projection, $h^1$, which is adapted during its revolution at the time when the lights would be usually turned on, to come in contact with the arm, $e^7$, of the closing plunger and thus prevent said arm from being moved downwardly under the action of the tripping lever. This projection contacting in this way with the arm will prevent the operation of said arm during that twenty-four hours, but will move on sufficiently to pass out of the path of the arm during the twenty-four hours so that at the next switch-opening period the plunger will be operated as before. If desired, the wheel, $h$, may be provided with a series of openings $h^2$ into which a projection, $h^1$, may be inserted so that at any time a projection can be inserted into one of these openings, $h^2$, so as to prevent the turning on of the lights at any given time during the week for a holiday or for any other reason.

Inasmuch as the power to open the switch is necessarily more than that required to simply wind the motor, I provide means for cushioning the effect of the solenoid while the motor is being wound at the periods when the switch is not to be operated. I do this to prevent the shock from the fast moving solenoid core by the excess of magnetic force of its winding and also to render the machine more or less noiseless in its operation of winding. This I accomplish by placing in the upper portion of the solenoid an air chamber, $a^3$, adapted to be closed by a spring-pressed air valve, $a^4$. This air valve is attached to a lever, $a^5$, which is connected by suitable connections, $a^6$, to the arms, $e^7$, of the respective plunger casings. The air valve, $a^4$, is normally closed so that an air cushion is formed in the top of the solenoid which tends to cushion the effect of the quick movement of its core in the operation of winding. When, however, either of the plungers is tripped to bring it into position for operating the switch, the tripping of the plunger will also open the air valve through the connection, $a^6$, and lever, $a^5$, and thus when the switch is being operated the cushioning effect of the air chamber will be obviated and the full power of the solenoid will be obtained for operating the switch as well as winding the motor.

It sometimes occurs that it is desirable to have the lights go on earlier than the regular time, owing to a particularly dark day, this being accomplished for one particular day or evening without disturbing the regular routine of the mechanism. For this purpose I have shown in Fig. 1 a magnet, $g$, the armature, $g^1$, of which is connected by suitable connections to the switch closing plunger, $e$, or more properly speaking to the plunger casing. A circuit shown in diagram and marked "2" in the drawings is made to include a switch, $g^3$, which is placed in convenient reach of the proprietor and which may be manually operated. The closing of this switch will establish a circuit from the fuse-box, $d$, to the magnet, $g$. This magnet will move the switch closing plunger to its operative position so that it will be operated at the first winding operation whenever that may be. As soon as the lights have been turned on, the switch $g^3$ will be opened, and the lights will remain on until the usual time for turning them off. This circuit "2" may also be used as a detector or burglar alarm, by attaching an automatic switch, as shown at $g^4$, to some part of the apparatus to which a burglar would be apt to go, for instance to a cash register or cash drawer. In this connection I also provide an auxiliary lamp, $g^5$, placed in the circuit "2" and which is preferably placed outside of the store in a conspicuous place and colored red, so that the moment the circuit should be closed by the operation of the self-closing switch, $g^4$, the red light, $g^5$, would begin to burn which would notify the police or passers-by of an abnormal condition in the store, while as soon as the winding interval had been reached all the lights would be turned on which would make it possible to readily detect the operations of the intruder or have the effect of frightening him off.

The construction of the switch, $g^4$, is shown in Fig. 5. The switch is made the same as the usual blade switch but has a central piece, $g^6$, which is pivoted at $g^7$, in such a way that when the switch is opened it will be held open by the pressure of the spring. As soon as the switch has started to close, however, the spring, $g^8$, bearing at a slightly different angle on the end $g^{11}$ of the arm, $g^6$, will cause the switch to snap into its closed position. A second spring, $g^9$, connected by a suitable connection, $g^{10}$, to the switch arm is also preferably used, this spring being kept under tension by the cash drawer or other device. In case the cash drawer is opened the spring, $g^9$, being released will draw down on the arm and cause the spring, $g^8$, to be snapped into its position. This switch, it will be understood, will be concealed in case it was applied to a cash drawer or similar apparatus and its presence would be unknown to the burglar or anybody not having business in the cash drawer. Any form of switch, however, which would be closed by any unusual operation might be used.

It sometimes happens that it is desirable to have the lights burn longer on certain nights. Of course this can be accomplished by re-adjusting the hands at any time but it may be desirable that on certain nights they would uniformly burn for a longer period. To provide for this I preferably employ an additional timing wheel, $k$, which I have shown geared to the "seven-day"

wheel $h$ and adapted to make a revolution each time the "seven-day" wheel revolves. In connection with this wheel, $k$, I employ an arm or pin, $k^1$, which may be secured in different relative positions with reference to said wheel but adapted to operate with it. This arm may be set so that once during each revolution it will contact with the operating arm, $c^2$, which by its movement sets the switch opening plunger into position. The upper portion of this arm, $c^2$, is preferably formed at an angle or on a bevel, and on this beveled face is placed a graduated scale, the arrangement being such that as the operating arm falls it will engage in the end of the arm or pin, $k^1$, and be retained. As the arm, $k^1$, moves with the wheel, $k$, it will be gradually moved out of the way of the operating arm, $c^2$, and permitted to drop but at a later period than the one determined by the ordinary timing device. The forming of the arm, $c^2$, at an angle and having it contact with the end of the pin, $k^1$, enables me to make a much larger scale for the slow moving arm, $k^1$, than could be used if an ordinary dial or indicator were used to indicate the proper position of the arm, $k^1$, in adjusting it to the length of time it was desired to retain the operating arm, $c^2$ in falling. In adjusting this arm, $k^1$, it would be necessary to make the adjustment the first time about the time the lights were usually turned on when the arm, $c^2$, could be moved forward manually until it contacted with the end of the arm, $k^1$. If it was desired that the lights should remain on for an additional period, the period at which it was to remain would be indicated by the scale on the end of the arm, $c^2$. The farther away the arm is placed the longer it would take the arm, $k^1$, to replace the operating arm, $c^2$. After these parts have been once set in this position they would continue to operate uniformly thereafter until again set, that is to say for instance every Saturday night, the operating arm for opening the switch would be retarded in its movement for one, two or more hours or fractions thereof, according to the way the pin or arm, $k^1$, was set in relation to said operating arm.

It should be noted that the main operating lever, $b$, is prevented from moving too far on the upward movement of said arm by its stop, or similar construction, $b^5$, which limits the upward movement of the inner end of the arm in the winding operation.

As above described, the weighted arms, $c^2$ $c^3$, are adapted to fall by gravity soon after they have been moved to a vertical position. It might happen, however, that in the winding operation the movement of the lever, $b$, would be largely over before they had reached the exact time of operation. To prevent this, I preferably attach a small spring, $c^{13}$, to the weighted arms, $c^2$ $c^3$, which springs are adapted to contact with the stationary stop, $c^{14}$, on the frame and prevent the arms from falling until they are moved forward by the timing device sufficiently to cause the spring, $c^{13}$, to snap over the projection, $c^{14}$, in which position they will be free to fall and operate the respective plunger casings unless they are detained by the stop mechanism before described. It is obvious that the same result may be obtained by spring arms, $c^{15}$, as shown in Fig. 6, in which case the arms may be connected to the respective sleeves. It is preferable, however, in this case to have a stationary stop such as shown at $c^{16}$ in Fig. 7 to engage the ends of the spring and retard them while the sleeves continue to move until the springs have received sufficient tension to snap over this stationary part, $c^{16}$, and engage the ends of the arms, $e^7$, on the plunger casings.

It is obvious that for just the ordinary timing operation and turning on of the lights and turning off at a certain night the wheel, $k$, may be omitted.

In Fig. 14 I have shown a diagram of circuits, the corresponding parts being marked to correspond with the different views. In this case I have shown attached to the circuit $z$ and $z^1$, lamp circuits, $z^2$, $z^3$, $z^4$ and $z^5$, any number of which or any arrangement of which may be readily used.

It will be seen from the above description that by setting the hands on the dial, $c^7$, and starting the motor to operating that it will operate continuously, being self-winding by the use of the solenoid, $a$, and the main lever, $b$, and that when the timing motor has caused the tripping device to engage with the respective plunger casings the switch operating mechanism will be brought into position to be operated upon the succeeding movement of the solenoid or winding mechanism, and that the main switch will be opened or closed, thus turning off or on the lights as desired. By the use of the auxiliary switch, $g^3$, and the controlling magnet, $g$, the timing mechanism can be made to work in advance of the time for which it is set, also that by the use of the auxiliary wheel the operating mechanism may be cut out entirely for one or more days, or the lights caused to be burned longer upon certain days than upon others.

When the weighted arms, $c^2$ and $c^3$, are used, I preferably provide the plunger casings with an auxiliary projection, $e^{10}$, which when the plunger is tripped will move over the weights and prevent the same from rebounding thus insuring the operation of the device.

In order to insure the connections between the hooks, $e^5$, on the main operating lever, $b$, and the rings, $e^4$, on the plungers, $e^1$ $e^2$, the rings, $e^4$, are preferably set at an angle, as shown, so that when the plungers have been moved into the operating position the hooks will by the movement of the lever, $b$, be moved downwardly past said rings pressing them slightly away until the rings snap over said hooks, thus firmly engaging the parts together.

Having thus described my invention, I claim—

1. In a timing switch, a timing mechanism for controlling the operation of the main switch, an electrically operating mechanism, such as a solenoid, for periodically winding said timing mechanism, and means controlled by the timing mechanism for causing the said operating mechanism to actuate the switch during one of the periods of winding, substantially as specified.

2. In combination with a main switch, a periodically operating electric device and a motor wound up by the periodical movements of said electric device, means connected with said motor for controlling an intermediate mechanism to cause said periodically-operating electric device to operate said switch when the motor has operated a predetermined time, substantially as specified.

3. In a circuit controlling device, a solenoid, a motor operated thereby so as to be periodically wound up by the operation of said solenoid, means for causing the solenoid at predetermined times to operate the main switch, and an air cushion connected with said solenoid to cushion the effect of said solenoid in winding, and a valve adapted to be opened when said solenoid is to operate the main switch and destroy the air cushion.

4. In combination with a motor, a main lever for operating the same, a solenoid connected to said main lever, normally inoperative plungers adjacent to the range of movement of said lever, engaging projections operated by said motor to trip the plungers at predetermined intervals and bring them in the path of said operating lever, said plungers being connected to the main switch, and engaging projections between said main lever and plungers, substantially as specified.

5. In a timing device for electric switches, a motor, a main winding lever, a solenoid for operating said lever, a circuit closer for establishing the circuit in said solenoid when the main lever reaches a predetermined position and for breaking said circuit when the solenoid has restored said lever to its normal position, intermediate tripping devices adapted when in operative position to engage said lever and cause it to move the main switch, and means connected with said motor for tripping said devices at predetermined intervals.

6. In a device for controlling electric switches, a timing motor, an operating motor, and electric switch, two time operating devices controlled by said timing motor, means for establishing a connection at predetermined intervals between said switch and said operating motor by the operation of said time operating devices, and an auxiliary timing device operated by said timing motor to form a bar to the operation of one of said time operating devices at predetermined intervals to prevent the establishment of the connection between said switch and operating motor, substantially as specified.

7. In a timing mechanism for electric switches, a timing motor, an operating motor, a switch, two time operating devices connected to said timing motor, one of said time operating devices being adapted by its operation to establish a connection between said switch and said operating motor to open the switch, and the other of said time operating devices being adapted by its operation to establish a connection between said switch and said operating motor to close the switch, and an additional auxiliary device operated by said timing motor to prevent the operation of the switch-closing time operating device, substantially as specified.

8. In an electric switch operating device, a timing motor, electric mechanism for periodically winding said motor, normally inoperative mechanism adapted when tripped by said motor to be operated by the electric device to open or close the main switch, and an auxiliary circuit including an electromagnet adapted when said circuit is closed to cause said tripping device to operate independent of said timing mechanism.

9. In combination with the solenoid, the main operating lever and the plungers adapted to be engaged by said lever but normally in inoperative position, means operated by a motor for tripping said plungers, and an auxiliary circuit including an electromagnet adapted to trip one of said plungers independent of the timing device when the said circuit is closed, substantially as specified.

10. In a switch operating mechanism, a timing device adapted at predetermined intervals to operate said switch, and an auxiliary circuit including an electro-magnet adapted when closed to cause said switch operating mechanism to be thrown into operation independent of the timing mechanism, and a signaling device also included in said circuit to cause a signal to be given when said mechanism is operated by said auxiliary circuit.

11. The combination with a solenoid, main operating lever and the timing motor, pivoted plunger casings having the tripping devices, engaging parts on said motor adapted at predetermined intervals to trip said plunger casings, engaging parts between said main levers and said plungers, and connections from said plungers to the main switch.

12. In a time operating mechanism, a timing motor, an operating motor, two periodically operating devices connected with said timing motor, one of said devices by its operation causing said operating motor to open the switch and the other of said devices by its operation causing said operating motor to close the switch, and an auxiliary timing device connected with said timing motor to periodically retard the movement of the switch-opening operating device to cause said switch to remain closed for a predetermined period and then release said switch-opening operating device to cause said switch to be opened, substantially as specified.

13. In combination with the timing motor having two twenty-four hour operating devices, a secondary device or "seven-day" wheel adapted at given multiples of twenty-four hours to prevent the operation of one of said devices, and a second auxiliary timing device adapted at a given multiple of twenty-four hours to retard the action of the second device, as and for the purpose specified.

14. In a switch timing mechanism, a motor, an electrical device for periodically winding said motor, which winding mechanism is controlled by said motor, tripping mechanism to cause said winding mechanism to also operate the main switch, an auxiliary circuit including an electro-magnet adapted when closed to cause said tripping device to operate independent of the timing mechanism, and an automatic operating switch adapted to be operated by the unusual operation of some auxiliary devices, such as a cash drawer, substantially as and for the purpose specified.

15. The combination of a main lever having opposite hooks, of a main switch having connections on opposite sides thereof, an intermediate device forming a part of said connections adapted to be engaged by said hooks when said connections are moved into operating position, and a timing mechanism for moving said connections into the path of said hooks.

16. The combination of a main operating lever, a solenoid connected thereto, oppositely-extending hooks, pivoted intermediate connecting devices adapted to be moved to or from the line of travel of said hooks so as to be made to engage the same, a circuit closer included in the circuit with said solenoid, and means connected to the main operating lever for opening and closing said circuit closer in the different positions of said main operating lever, substantially as specified.

17. The combination with the main oscillating lever, a weight for moving the same, and operating a timing motor, means for periodically retarding said lever, oscillating pivoted connections adapted at certain intervals determined by the timing motor to be brought into operating position, and means on said main lever to engage said connecting devices when moved to the operating position, and a loose connection from said connecting devices to the opposite sides of the operating switch, substantially as specified.

18. In a device of the character described, a main switch having a pivoted member, a main operating device, means for periodically operating said device, two time-operating devices, means for alternately connecting same at pre-determined times with said main operating device, and a loose connection from each of said time-operating devices to the pivoted member of said main switch, substantially as specified.

19. In a device of the character described, a main switch having a pivoted member, a main operating device, means for periodically operating said device, two time-operating devices, a timing motor for alternately connecting said time-operating devices with said main operating device at predetermined intervals, and a loose connection from each of said time-operating devices with the pivoted member of said main switch, substantially as specified.

20. In a device of the character described, a main switch having a pivoted member, a main electrical operating device, an auxiliary switch, means for periodically closing said auxiliary switch to send an impulse through said main operating device, two pivoted time-operating devices, a timing motor for alternately connecting said time-operating devices with said main operating device at predetermined intervals, and a loose connection from each of said time-operating devices with the pivoted member of said main switch, substantially as specified.

21. In a device of the character described, a main switch having a pivoted member, a main operating device, means for periodically operating said device, two pivoted members each having a plunger located therein, means for alternately engaging said plungers with said main operating device, and a loose connection from each of said plungers to the pivoted member of said main switch, substantially as specified.

22. In a device of the character described, a main switch having a pivoted member, a main operating device, means for periodically operating said device, two pivoted spring-pressed members each having a plunger located therein, means for alternately moving said members against the tension of their springs to a position to cause said plungers to engage with said main operating device at predetermined intervals, and a loose connection from each of said plungers to the pivoted member of said main switch, substantially as specified.

23. In a machine of the character described, a main switch, electrically operated devices, intermediate connections between said devices and said switch normally disconnected from said devices, a timing motor for controlling the movement of said devices and connecting said intermediate connections to the same, and means for winding said motor by said devices upon each operation of the same, substantially as specified.

In testimony whereof, I have hereunto set my hand this 25th day of June, 1907.

GEORGE R. CLARK.

Witnesses:
SAML. B. RICKETTS,
A. R. WULFF.